(12) United States Patent
Sogabe

(10) Patent No.: US 7,441,091 B2
(45) Date of Patent: Oct. 21, 2008

(54) STORAGE CONTROL DEVICE AND STORAGE CONTROL METHOD

(75) Inventor: Kosuke Sogabe, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 314 days.

(21) Appl. No.: 11/347,288

(22) Filed: Feb. 6, 2006

(65) Prior Publication Data

US 2007/0118704 A1    May 24, 2007

(30) Foreign Application Priority Data

Nov. 22, 2005    (JP) .............................. 2005-337776

(51) Int. Cl.
*G06F 12/16*    (2006.01)
*G06F 13/00*    (2006.01)
(52) U.S. Cl. ........................ 711/162; 711/100; 711/154; 711/161
(58) Field of Classification Search ................. 711/162, 711/161, 100, 154
See application file for complete search history.

(56) References Cited

U.S. PATENT DOCUMENTS 7,302,498 B2 *    11/2007    Tanaka ....................... 709/250

2004/0267829 A1    12/2004    Hirakawa et al.
2005/0027749 A1    2/2005    Ohno et al.

FOREIGN PATENT DOCUMENTS

JP    2005-018506    6/2003
JP    2005-050143    7/2003

* cited by examiner

*Primary Examiner*—Tuan V. Thai
(74) *Attorney, Agent, or Firm*—Reed Smith LLP; Stanley P. Fisher, Esq.; Juan Carlos A. Marquez, Esq.

(57) ABSTRACT

Provided is a storage control system enabling the prompt execution of data backup from a primary storage to a backup device, and capable of backing up data of the primary storage in the backup device without having to use a backup server. This storage control system has a host system; a storage device having a data volume storing data to be exchanged with the host system, a replication volume of the data volume, and a difference data volume configured independently from the data volume and which stores difference data in relation to the data volume; and a backup device having a backup volume storing backup data of the replication volume and the difference data volume; wherein the host system has a backup control module for recognizing the difference data volume of the storage device apart from the data volume, and backing up the difference data volume in the backup volume.

20 Claims, 14 Drawing Sheets

FIG.4

| UPDATE FLAG (1) | DATA VOLUME UPDATE ADDRESS (1) | DATA VOLUME UPDATE TIME (1) |
|---|---|---|
| UPDATE FLAG (2) | DATA VOLUME UPDATE ADDRESS (2) | DATA VOLUME UPDATE TIME (2) |
| ⋮ | ⋮ | ⋮ |
| UPDATE FLAG (N) | DATA VOLUME UPDATE ADDRESS (N) | DATA VOLUME UPDATE TIME (N) |

STORAGE CONTROL DEVICE AND STORAGE CONTROL METHOD

CROSS-REFERENCES TO RELATED APPLICATIONS

This application relates to and claims priority from Japanese Patent Application No. 2005-337776, filed on Nov. 22, 2005, the entire disclosure of which is incorporated herein by reference.

BACKGROUND

The present invention relates to a storage control system in which a backup device is connected to a storage device.

Conventionally, in this kind of storage control system having a backup device, a replication volume of a data volume is formed in the storage device, and the replication volume is fully backed up in the backup device. Further, as another backup system, known is a system where a snapshot from a pool area storing the data volume and difference data is acquired by a primary storage device, and backed up with a secondary storage.

Japanese Patent Laid-Open Publication No. 2005-18506 describes a storage control device in which a first storage system stores information relating to the update of data as a journal, and a second storage system connected to this first storage system stores a replication of the data stored in the first storage system, and, by using the journal, data corresponding to the data of the first storage system is updated in the data update order in the first storage system.

Further, Japanese Patent Laid-Open Publication No. 2005-50143 discloses a storage control system enabling the acquisition of a snapshot with a method that does not require a standstill and which manages the backup and restoration in an environment where various platforms coexist. In other words, a database management program performs checkpoint processing for securing the consistency of data. A snapshot acquisition control program externally detects this checkpoint processing of the database management program, and creates a snapshot in an external storage device in link with the timing of this checkpoint. Data of an arbitrary checkpoint can be restored in a short period of time by retaining the association of the checkpoint and snapshot in a CP-SH correspondence management table.

SUMMARY

With a conventional storage control system enabling data backup, since the replication volume of the data volume is backed up in the external storage device, much time was required for the backup. Further, even if the replication volume of the primary storage is initially copied to the backup volume of the external storage device, and only the difference data is thereafter backed up in the external storage device in order to shorten the time required for the backup, it is not possible to extract only the difference data from the snapshot.

Thus, an object of the present invention is to provide a storage control system enabling the prompt execution of data backup from a primary storage to a backup device, and capable of backing up data of the primary storage in the backup device without having to use a backup server.

In order to achieve the foregoing object, the present invention provides a storage control system in which a difference data volume storing difference data is provided to the storage device independent from the data volume, this difference data volume is made to be recognizable from the data backup program of the host system, and the data backup program copies the difference data volume of the storage device in the backup volume of the backup device.

In other words, the present invention pertains to a storage control system including a host system; a storage device having a data volume storing data to be exchanged with the host system, a replication volume of the data volume, and a difference data volume configured independently from the data volume and which stores difference data in relation to the data volume; and a backup device having a backup volume storing backup data of the replication volume and the difference data volume; wherein the host system has a backup control module for recognizing the difference data volume of the storage device apart from the data volume, and backing up the difference data volume in the backup volume.

Further, in another aspect of the present invention, provided is a storage control method where a primary storage is connected to a host system, and the volume of this primary storage is backed up in a volume of a secondary storage to be connected to the primary storage, including the steps of: the host system recognizing a difference data volume storing difference data in relation to a data volume of the primary storage apart from the data volume; the host system initially copying the data volume in the secondary storage upon backing up data of the primary storage in a volume of the secondary storage; and after the initial copy, the host system performing difference backup of the difference data volume in the secondary storage volume.

As explained above, according to the present invention, since the host system is able to recognize the difference data volume of the storage device, the difference data volume needs to be merely backed up in the backup device after the initial copying of the data volume upon backing up the primary storage volume in the backup device, data backup to the backup device can be conducted promptly, and a storage control system capable of performing backup processing without having to use a backup server can be provided.

DESCRIPTION OF DRAWINGS

FIG. 4 is an example of a management table of the update data volume;

DETAILED DESCRIPTION

Figure 1:
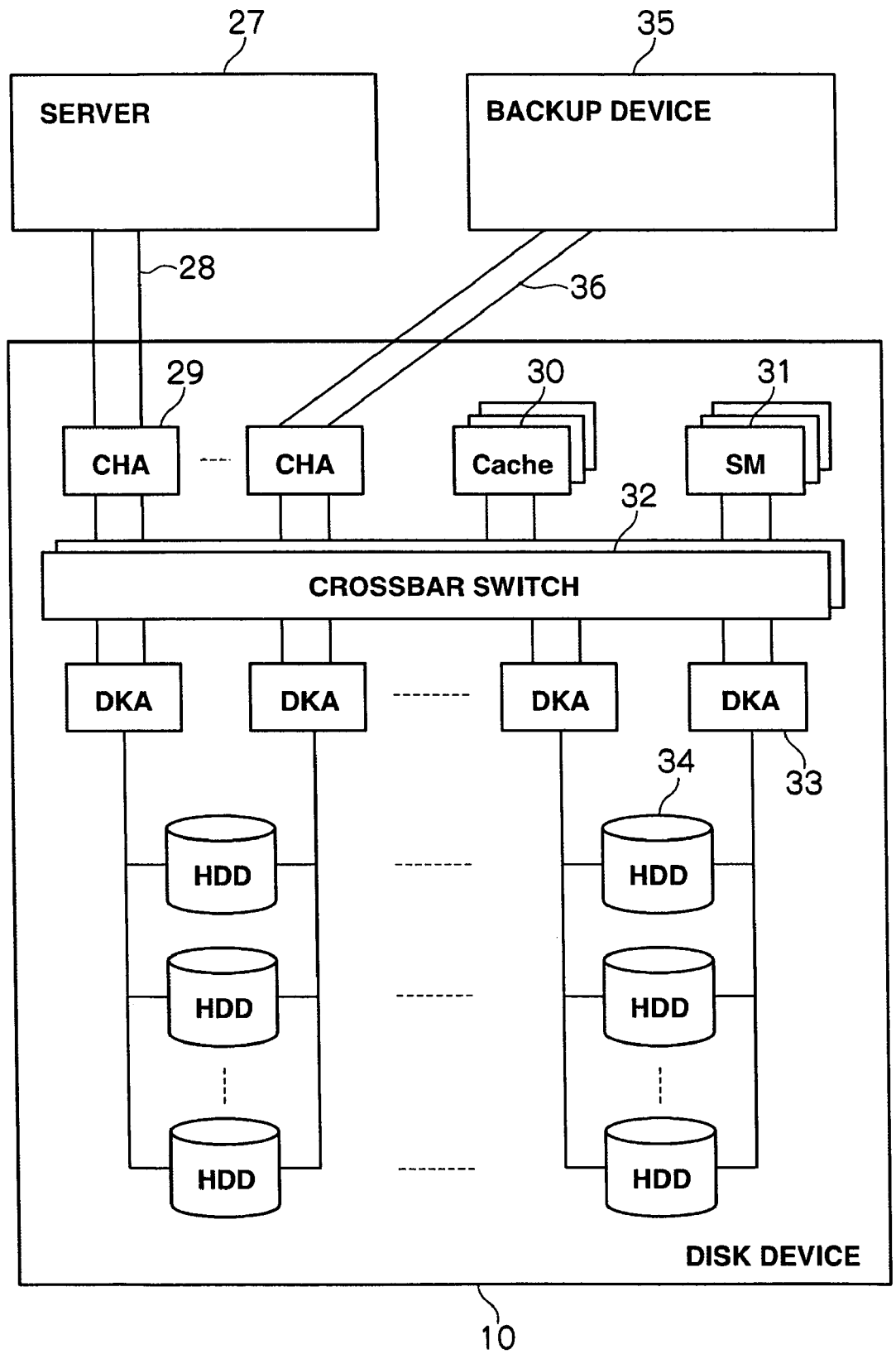
FIG. 1 is a hardware configuration of the storage control system according to the present invention.

Embodiments of the present invention are now explained with reference to the drawings. The embodiments described below are merely examples of the present invention and do not limit the interpretation of the present invention in any way. The following embodiments may be modified or improved, and the present invention covers all equivalents thereof. FIG. 1 is a hardware block diagram of the storage control system pertaining to the present invention.

A primary storage 10 has a channel adapter 29, a cache memory 30, a shared memory 31, a disk adapter 33, a connection 32 formed from a crossbar switch, and a physical volume 34. The channel adapter 29 is an interface for receiving an I/O request from a host device as the host system or a server 27.

The cache memory 30 and shared memory 31 are memories to be shared by the channel adapter 29 and disk adapter 33. The shared memory 31 is primarily used for storing control information, commands and so on, and, for instance, stores a volume information table and a disk management memory described later. The cache memory 29 is primarily used for temporarily storing data.

For example, when the data I/O command received by a certain channel adapter 29 from the host computer 30 is a write command, the channel adapter 29 writes this write command in the shared memory 31, and writes the write data received from the server 27 in the cache memory 30. Meanwhile, the disk adapter 33 is monitoring the shared memory 31, and, when it detects that a write command has been written in the shared memory 31, it reads write data from the cache memory 30 according to such write command, and writes this in a physical volume (HDD) 34.

Meanwhile, when the data I/O command received by a certain channel adapter 29 from the server 27 is a read command, the channel adapter 29 writes such read command in the shared memory 31, and checks whether the data to be read exists in the cache memory 29. Here, when the data to be read exists in the cache memory 29, the channel adapter 29 reads such data from the cache memory 30 and transmits this to the server 27.

When the data to be read does not exist in the cache memory 30, the disk adapter 34 which detected that a read command has been written in the shared memory 31 reads the data to be read from the physical volume 34 and writes this in the cache memory 30, and writes to such effect in the shared memory 31. When it is detected that the data to be read has been written in the cache memory 30 as a result of the channel adapter 29 monitoring the shared memory 31, such data is read from the cache memory 30 and transmitted to the host system 27.

The disk adapter 33 converts the data access request based on a logical address designation transmitted from the channel adapter 29 into a data access request based on a physical address designation, and writes data in or reads data from the physical volume 34. When the physical volume 34 is configured in RAID, the disk adapter 33 accesses data according to the RAID configuration. In addition, the disk adapter 33 performs replication management and backup control of data stored in the physical volume 34.

The connection 32 mutually connects the channel adapter 29, cache memory 30, shared memory 31 and disk adapter [33]. The connection 90, for instance, is configured as a high-speed bus such as an ultra-fast crossbar switch or the like for performing data transmission by high-speed switching. Thereby, the communication performance between the channel adapters 50 will improve significantly, and high-speed file sharing functions and high-speed failover will be enabled. Incidentally, the cache memory 60 and shared memory 70 may be configured from different storage resources as described above, or a part of the storage area of the cache memory 60 may be allocated as the shared memory 70.

Figure 2:
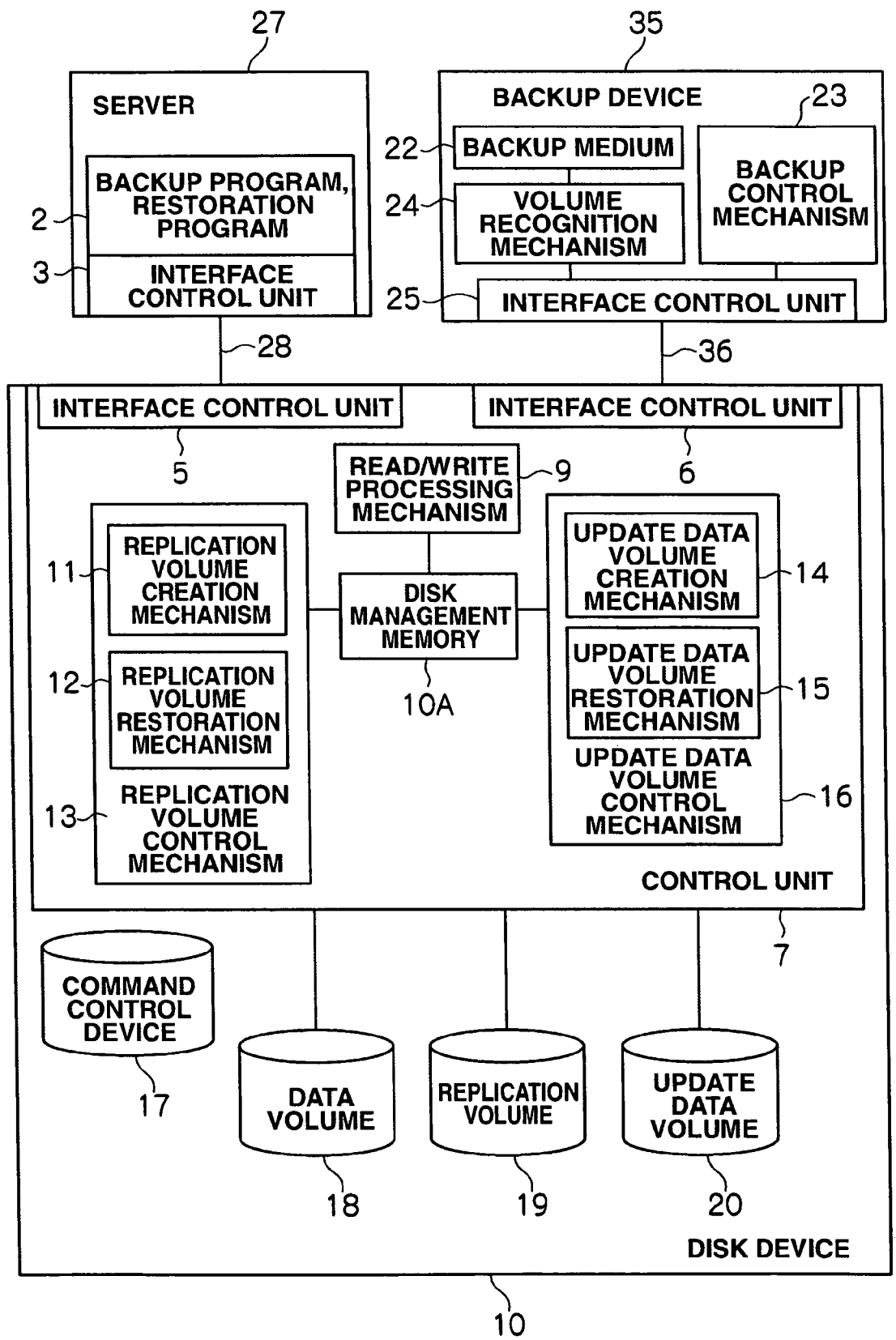
FIG. 2 is a functional block diagram of FIG. 1.

The primary storage 10 has one or more physical volumes 34, and provides a storage area accessible from the host system 27. As shown in FIG. 2 described later, a data volume 18, a replication volume 19 and an update data volume 20 are defined in the storage area provided by the primary storage. These volumes are defined in the storage space of one or more physical volumes 34.

In FIG. 1, reference numeral 28 represents a LAN or SAN for connecting the server 27 and primary storage 10, and reference numeral 36 is a SAN that connects the primary storage 10 and backup device (secondary storage).

FIG. 2 is a functional block diagram of the system shown in FIG. 1. The server 27 is connected to an interface control unit 5 of the primary storage via an interface control unit 3. Reference numeral 2 represents a backup program (backup control module) that recognizes the update data volume 20 of the primary storage 10, and writes the processing command for forming a backup of this volume in the backup device 35 in a command device 17 of the primary storage. Incidentally, although not shown, the channel adapter 29 and disk adapter 33 respectively have microprocessors and micro programs stored in a local memory.

The channel adapter 29 and disk adapter 33 realize the replication volume control mechanism 13, update data volume control mechanism 16 and read/write processing mechanism 9. Operation of the read/write processing mechanism is as explained with reference to FIG. 1. The replication volume control mechanism 13, read/write control mechanism 9 and update data volume control mechanism 16 are respectively connected to a disk management memory 10. The replication volume control mechanism 13 and read/write control mechanism 9, update data volume control mechanism 16, disk management memory 10, and interface control units 5, 6 configure the comprehensive control unit 7 of the primary storage 10.

Reference numeral 6 represents an interface control unit for connecting the primary storage 10 to the backup device 35. The backup device 35 has a backup medium 22 such as a tape device or ATA drive, a recognition mechanism 24 for respectively recognizing the respective volumes 19, 20 of the primary storage 10, and a backup control mechanism 23. The backup device 35 is basically configured the same as the primary storage 10 other than that an inexpensive backup medium can be used in comparison to the primary storage 10. The volume recognition mechanism 24 and backup control mechanism 23 are connected to the interface control unit 25 and back up the volume of the primary storage 10 in the backup medium 22.

The data volume 18 is a volume to be accessed by the server 27, and records latest data. The replication volume 19 is a mirror volume of the data volume 18. The creation and update of the replication volume will be described later. Incidentally, the server 27 may write the same data in the data volume 18 and replication volume 19 when data is not backed up. The update data volume 20 is a volume collecting update data for the data volume 18.

Figure 3:
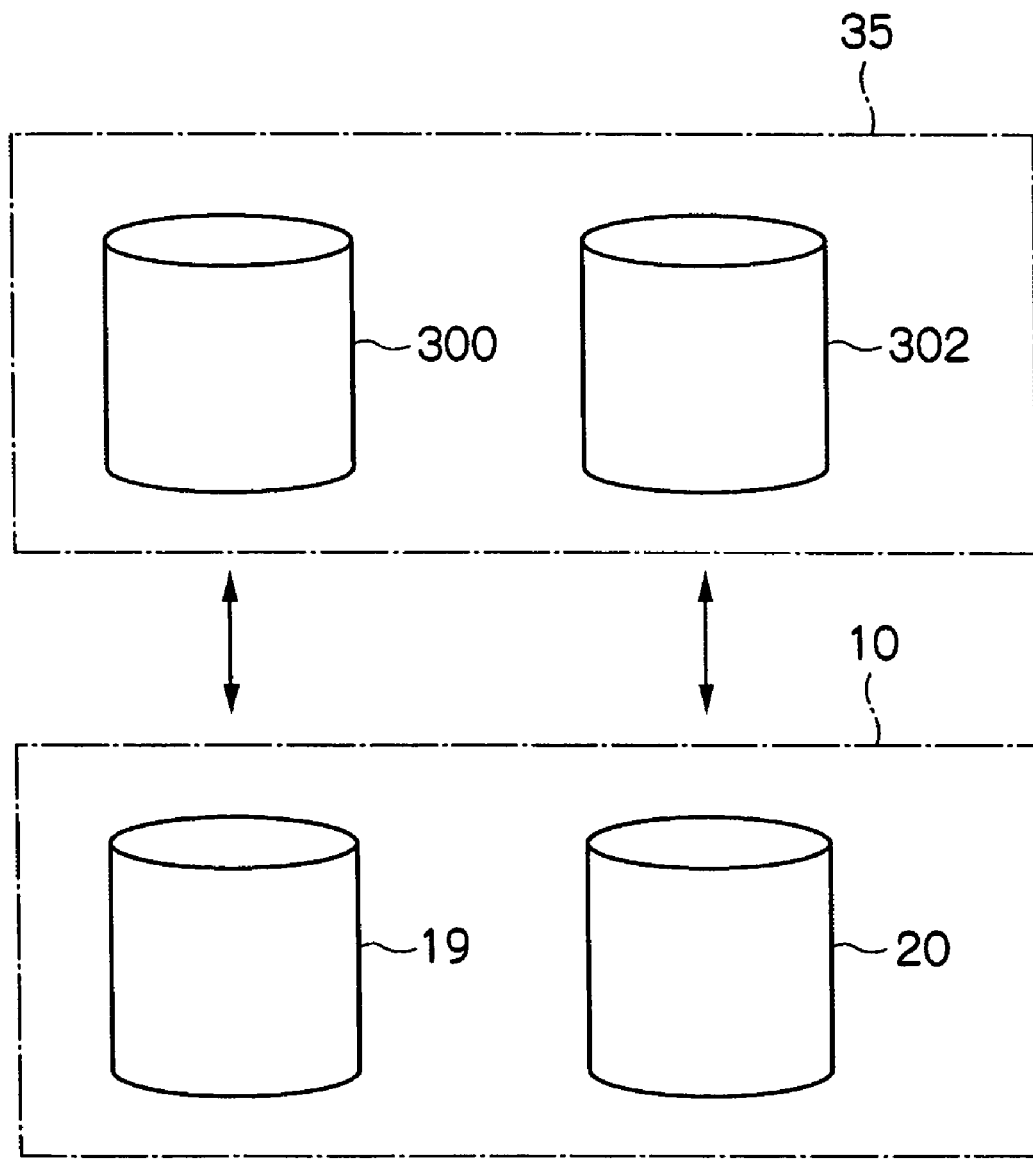
FIG. 3 is a functional block diagram showing the pair relationship of the primary storage volume and backup device volume.

A backup volume is defined in the backup medium of the backup device 35. FIG. 3 shows this backup volume, and a backup volume is configured from a backup volume 300 of the replication volume 19 and a backup volume 302 of the update data volume. The replication volume 19 and backup volume 300 form a copy pair relationship. The fact that these volumes form a copy pair relationship is set in a volume information table. This volume information table is registered in the shared memory 31 of the primary storage 10 and shared memory of the backup device 35. The control means of the primary storage 10 and backup device 35 is able to conduct the backup and restoration between volumes by referring to these information tables.

The disk management memory 10A stores an update data volume management table shown in FIG. 4. The update data volume creation mechanism 14 refers to the data of the data volume 18 and forms the table of FIG. 4, and sets this in the disk management memory 10A. The update flag of FIG. 4 is control information showing that the data has been updated. When this flag is set, the update data volume creation mechanism 14 recognizes that the data has been newly updated. A data volume update address is information showing which address data of the data volume has been updated, and the update time of the data volume shows the time when the data was updated.

The update data volume creation mechanism 14 creates the update data volume at a prescribed timing, and sets a volume name to this update data volume. The backup program 27 (refer to FIG. 2) of the server 27 specifies this volume name and copies the update data volume to the backup volume 302 (FIG. 3) of the backup device 35.

Figure 5:
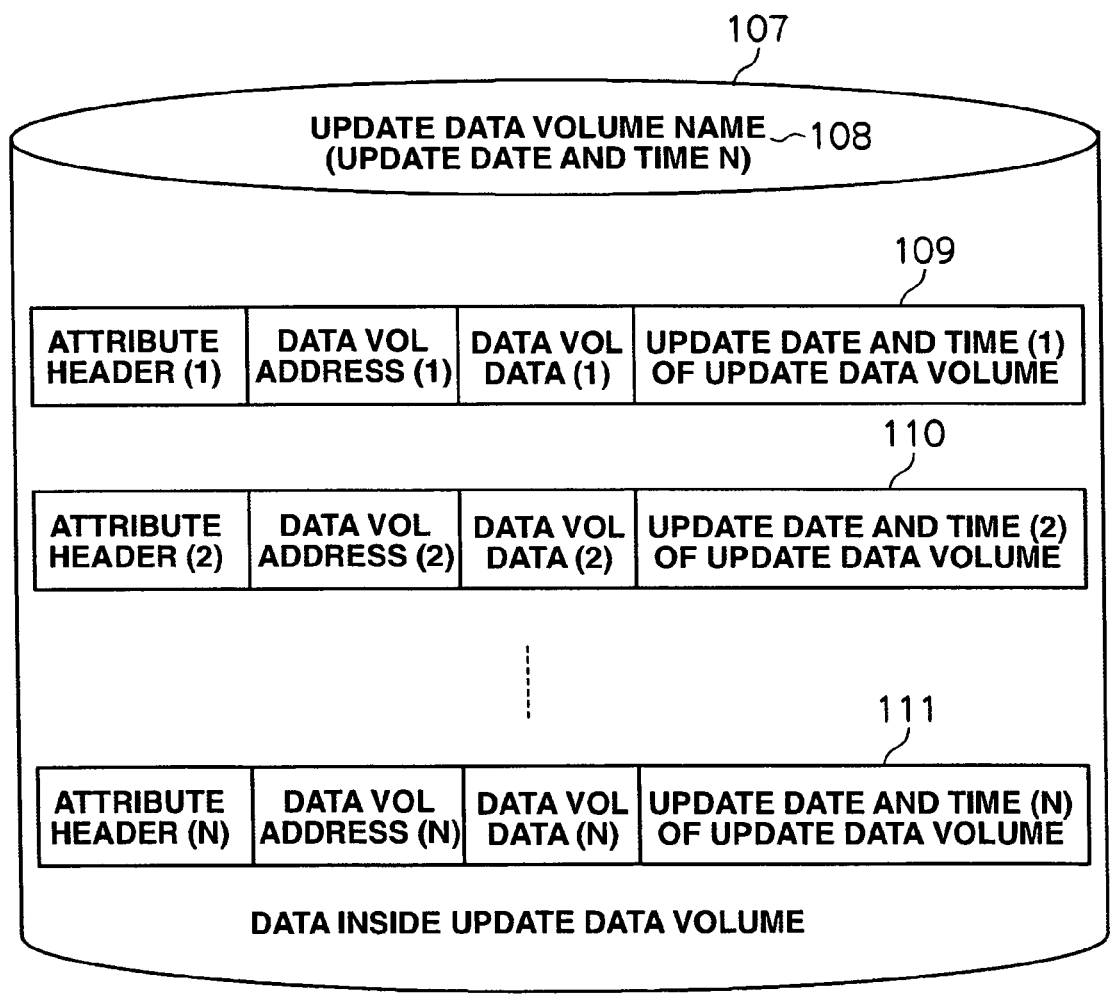
FIG. 5 is a data image of the update data volume.

FIG. 5 shows a data image in the update data volume 20. An attribute header is control information showing the data attribute (that the data has been updated), a data volume (vol) address is an address in a physical area of the data volume of the update data, a data volume data is update data stored in this address, and update date and time of the update data volume show the date and time in which the respective address areas of the update data volume have been updated. The update data volume creation mechanism, as shown in FIG. 4, refers to the control table information in the disk management memory 10A, extracts data that was updated in the update data volume from the previous update date and time to the current update time from the data volume, and uses the extracted information to update the update data volume itself. The update data volume name may be the update date and time in which the update data volume was updated.

In FIG. 2, the replication volume creation mechanism 11 is the subject that realizes the function for creating the replication volume 19 under the control of the backup program 2 of the server 27. The replication volume restoration mechanism [12] is the subject that realizes the function for copying (restoring) the data image of the backup volume 300 of the backup device to the replication volume 19 under the control of the restoration program 2 of the server [27]. The data restored to the replication volume 19 from the backup volume 300 is further restored to the data volume 18. The update data volume restoration mechanism 15 is the subject that realizes the function of restoring the backup volume 302 of the backup device 35 to the update data volume 20. The update data volume creation mechanism 14 is the subject that realizes the function of creating the update data volume 20.

Figure 6:
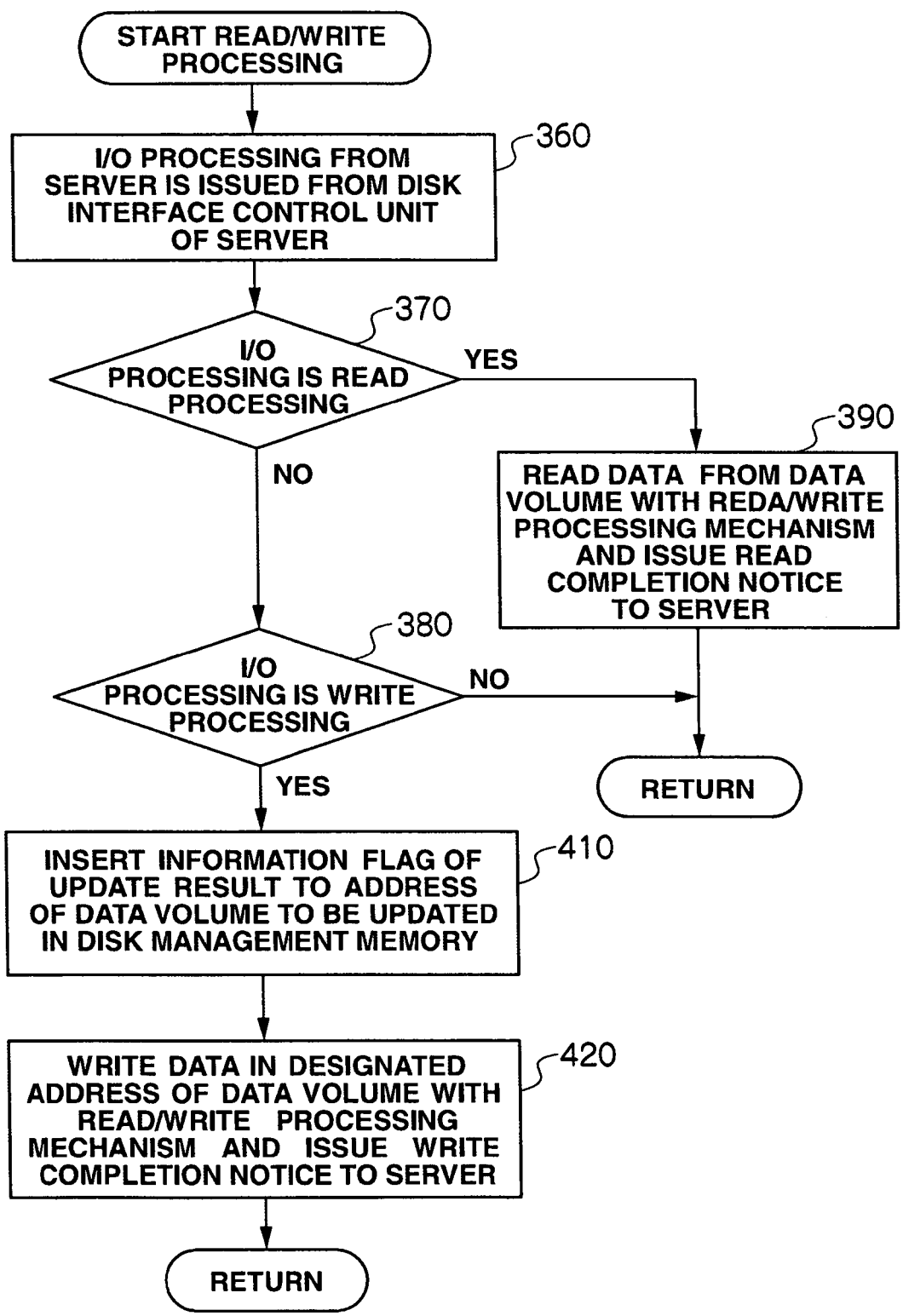
FIG. 6 is a flowchart showing the read/write processing.

FIG. 6 is an operation flowchart of the read/write processing. At step 360, the I/O processing request from the server 27 is issued from the interface control unit 3 of the server 27 to the primary storage 10. Next, the read/write processing mechanism 9 judges whether the I/O processing request is a read request (370), and, when this is affirmed, data is read from the data volume 18, and a read completion notice is issued to the server (390).

Meanwhile, at step 370, in the case of a negative judgment, whether the I/O processing is a write request is judged (380), and, when this is negated, the processing is ended. At step 380, when the I/O processing is judged to be a write request, an information flag (refer to FIG. 4) showing the update result of the data volume address to be updated is registered in the disk management memory (410). Next, the read/write mechanism 9 writes data in a designated address of the data volume, issues a write completion notice to the server and ends this processing (420).

Figure 7:
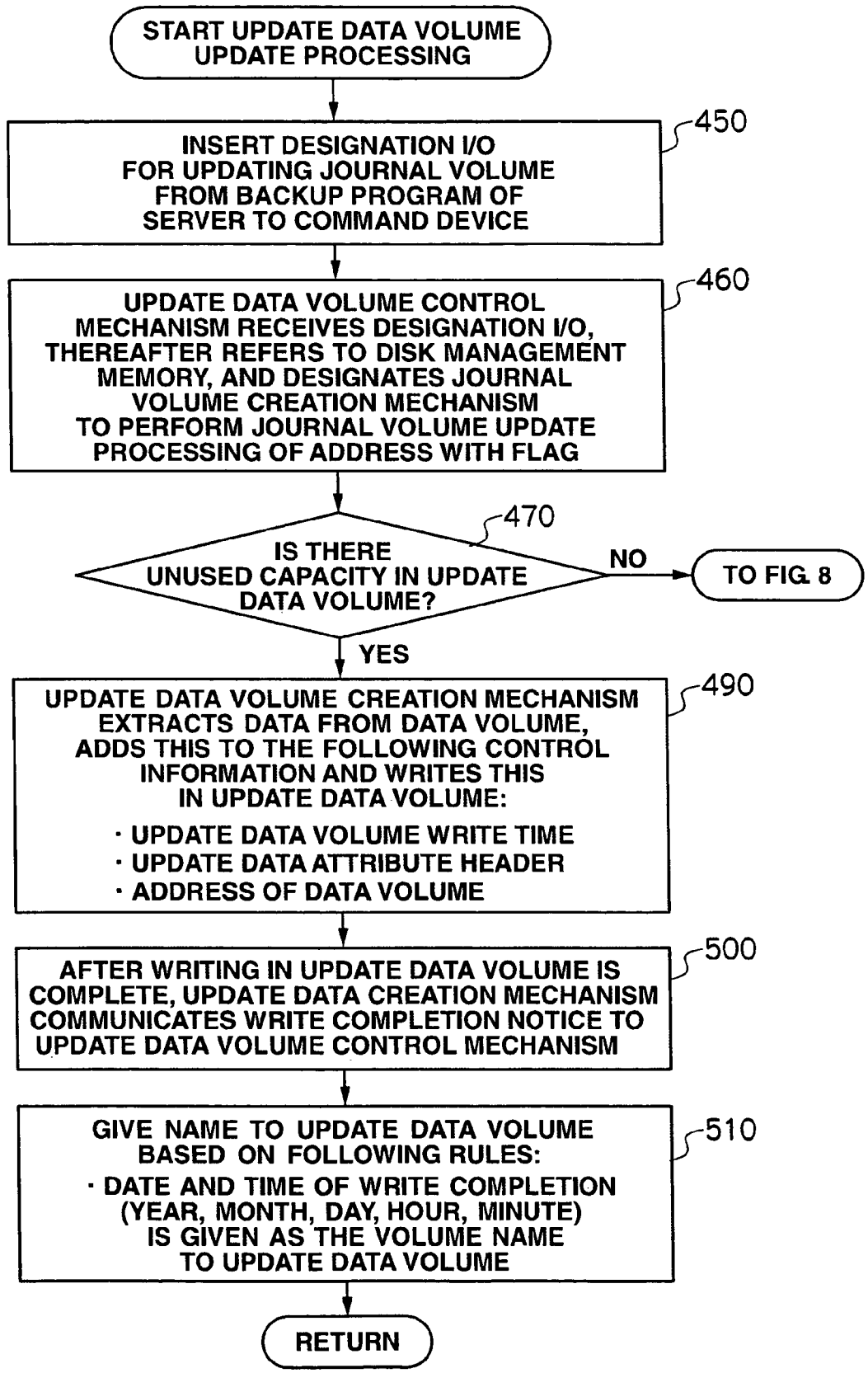
FIG. 7 is a flowchart showing the update data volume update processing.

FIG. 7 is a flowchart showing the update data volume update processing. A journal volume update designation I/O is registered from the backup program 2 of the server to the command device 17 of the primary storage 10 (450). The update data volume control mechanism 16 refers to the command device 17, receives the designation I/O, refers to the disk management memory (FIG. 4), and designates the update data volume creation mechanism to perform update processing of the update data volume area of the address with an update flag (460).

At step 470, whether there is unused capacity in the update data volume 20 is judged, and, when this is affirmed, step 490 is executed. At step 490, the update data volume creation mechanism 14 extracts data from the data volume, and writes this in the update data volume upon adding control information consisting of the update data volume write time, update data attribute header, and data volume address (refer to FIG. 5).

Next, after the writing in the update data volume is complete, the update data creation mechanism 14 issues a write completion notice to the update data volume control mechanism 16 (500). Next, at step 510, a name is given to the update data volume. This name is an identifier for recognizing the update volume from the host system. The update data volume is named based on the write completion date and time (year, month, day, hour, minute) (510). At step 470, when it is judged that there is no unused capacity in the update data volume, the flowchart of FIG. 8 is executed.

Figure 8:
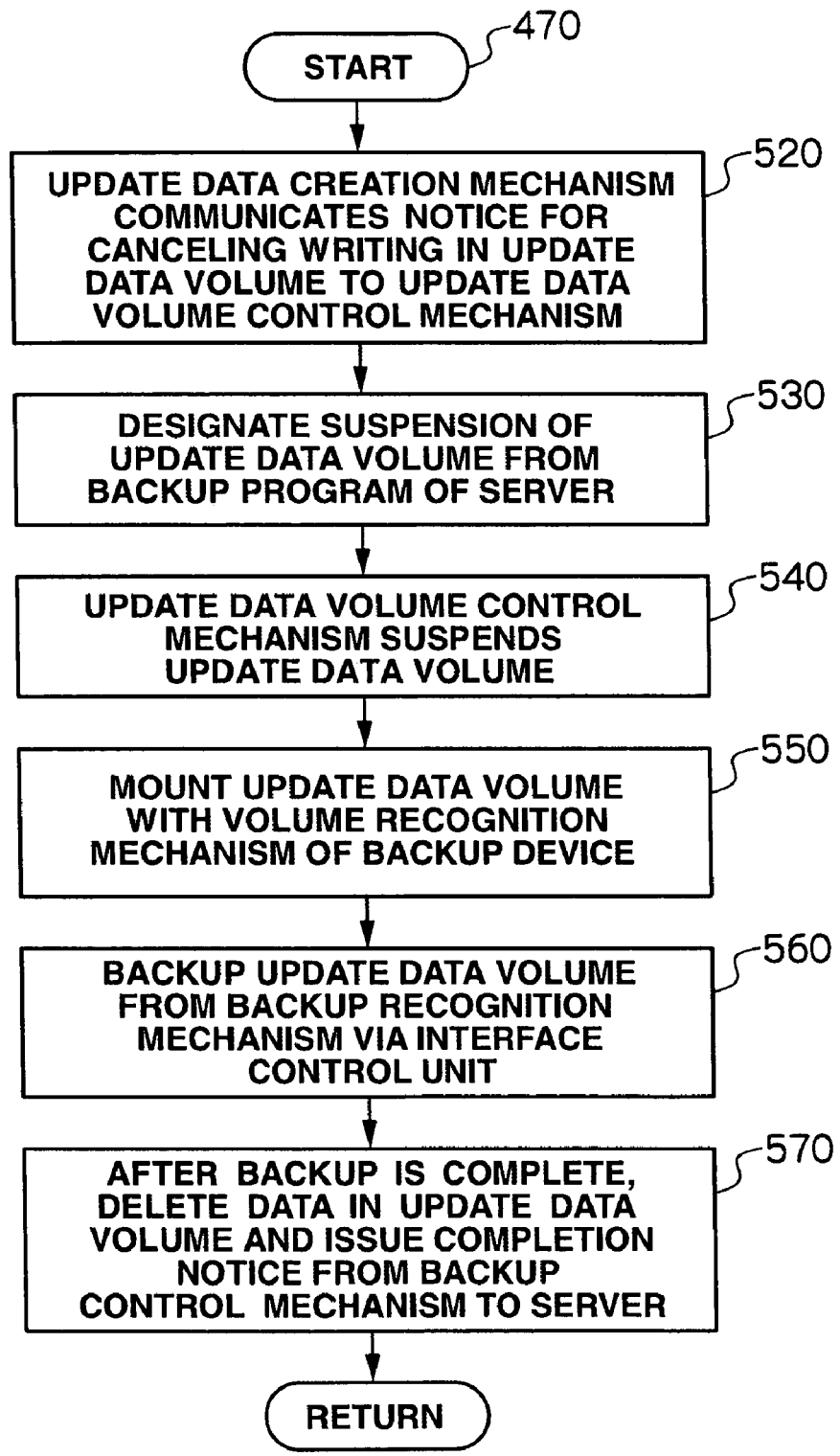
FIG. 8 is a flowchart showing the update data volume update processing (continuation of FIG. 7)

At step 520 of FIG. 8, the update data volume creation mechanism 14 issues a notice for canceling the writing in the update data volume 20 to the update data volume control mechanism 16. At step 530, the suspension of the update data volume 20 is notified from the backup program 2 of the server 27 to the update data volume control mechanism 16. Next, at step 540, the update data volume control mechanism 16 suspends the update data volume 20.

Next, the volume recognition mechanism 24 of the backup device 35 mounts the update data volume 20 on the backup volume 302 (550). Next, the backup recognition mechanism 23 backs up the update data volume 20 in the backup volume via the interface control units 6, 25 (560). After the backup is complete, data in the update data volume 20 is deleted, and a completion notice is issued from the backup control mechanism 23 to the server 27 (570).

Subsequently, registration of update data is continued until the capacity of the data update volume 20 becomes full, and the backup of the update data volume 20 is conducted once again when the capacity of the update data volume becomes full. The backup volume of the update data of the backup device 35 is assigned a storage capacity sufficient for backing up all update data for each backup that is performed. Update data volume information such as the update data volume name, volume capacity, physical address of the volume and so on are registered in the form of a control table in the disk management memory 10A. The backup program of the server is capable of recognizing the update data volume 20 apart from the data volume 18 by referring to this control table. Thereby, the update data volume 20 itself can be backed up in the backup device 35.

Figure 9:
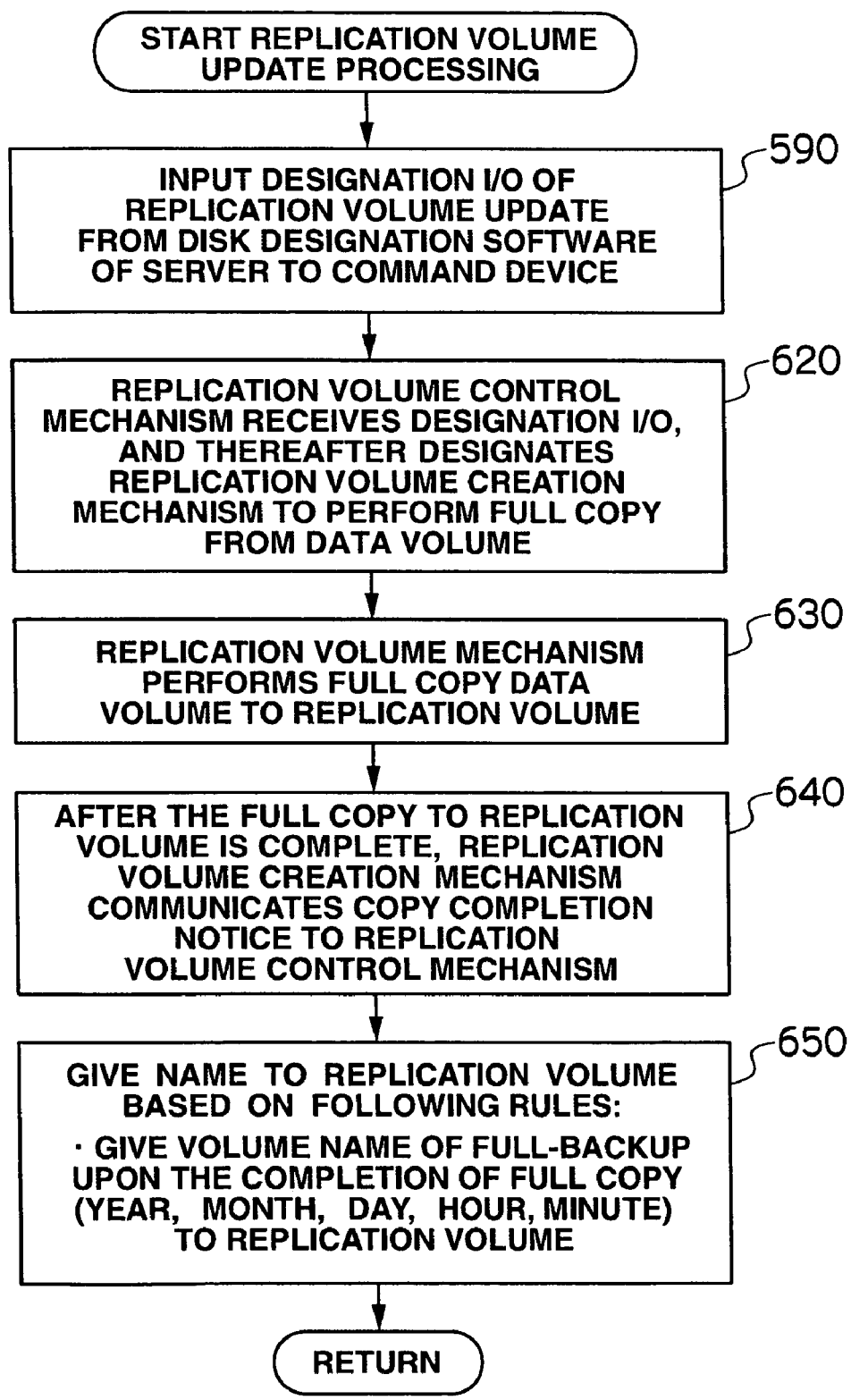
FIG. 9 is a flowchart showing the replication volume update processing.

FIG. 9 is a flowchart showing the replication volume creation processing. At step 590, the backup program 2 of the server 27 issues an update designation I/O of the replication volume 19 to the command device 17 of the primary storage 10. The replication volume control mechanism 13 receives this I/O, and thereafter designates the replication volume creation mechanism 11 to perform the full copy from the data volume 16 (620).

The replication volume control mechanism performs the full copy from the data volume to the replication volume (630). After the full copy to the replication volume is complete, the replication volume creation mechanism issues a copy completion notice to the replication volume control mechanism (640). Next, a volume name is given upon adding the words "Full Backup" to the date and time of full copy of the replication volume (650). The backup program 2 of the server refers to the control table including the replication volume name, volume capacity and volume number so as to differentiate and recognize the replication volume from the update data volume. Thereby, the replication volume 19 can be backed up in the backup device 35 apart from the update data volume.

Figure 10:
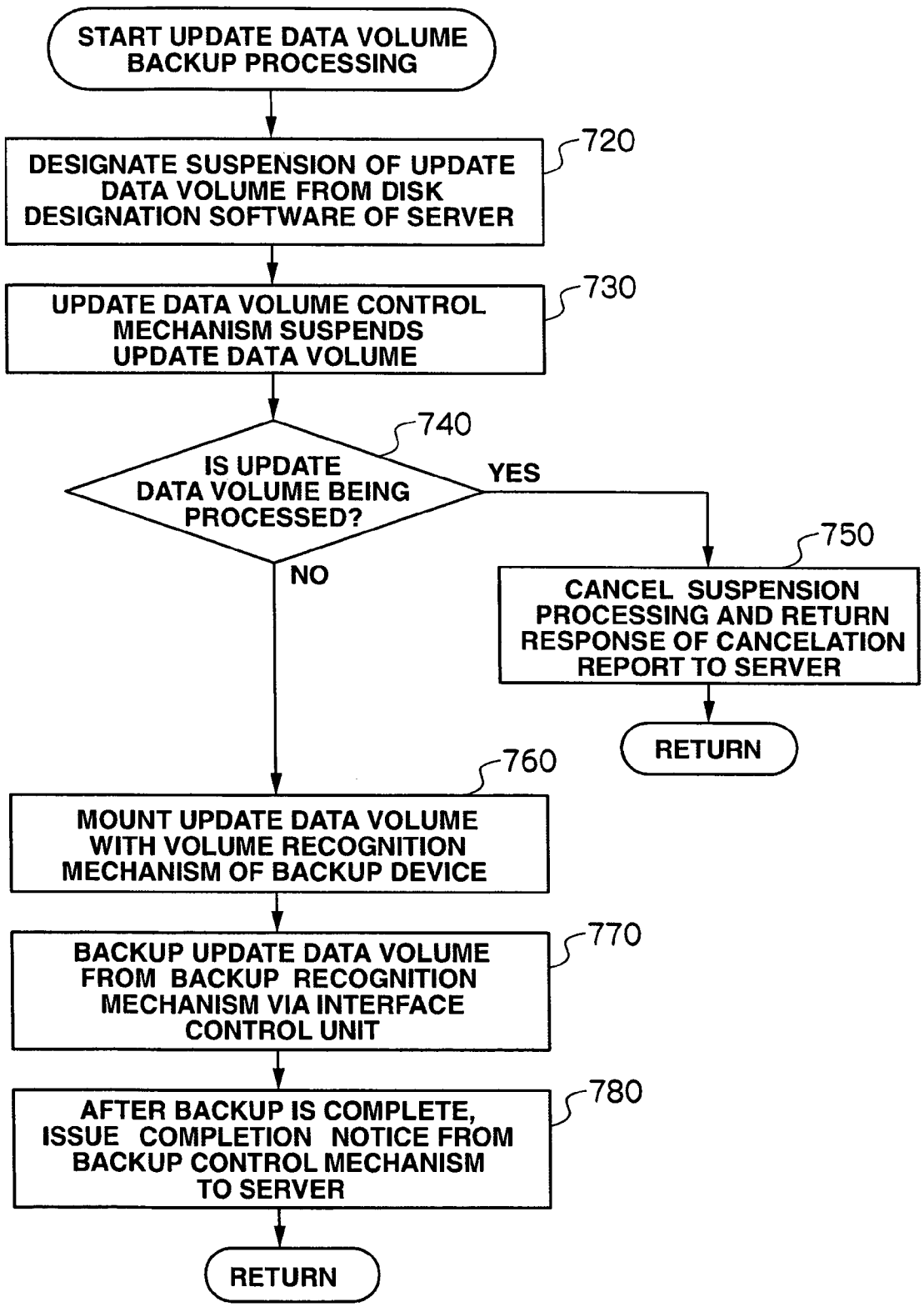
FIG. 10 is a flowchart showing the update data volume backup processing.

FIG. 10 is a flowchart showing another example of backing up the update data volume. In the example described above, the update data volume was backed up at the stage when the storage capacity of the update data volume became full. Nevertheless, in FIG. 10, for instance, backup is performed for each predetermined interval (each day, each week or each month). For each predetermined interval, the server 27 designates the update data volume control mechanism 14 to suspend the update data volume 20 for backup (720).

The update data volume control mechanism 16 suspends (stops) the update data volume (730). Next, the update data volume control mechanism judges whether an I/O has been issued to the update data volume; that is, whether the update data volume is being processed (740). Subsequent steps 760 to 780 are the same as steps 550 to 570 of FIG. 8.

At step 740, when the update data volume is being processed, the update data volume control mechanism 16 cancels the suspension of the update data volume, and issues a cancellation report to the server 27. The server issues a suspension designation once again at the timing when the processing of the update data volume is complete.

Figure 11:
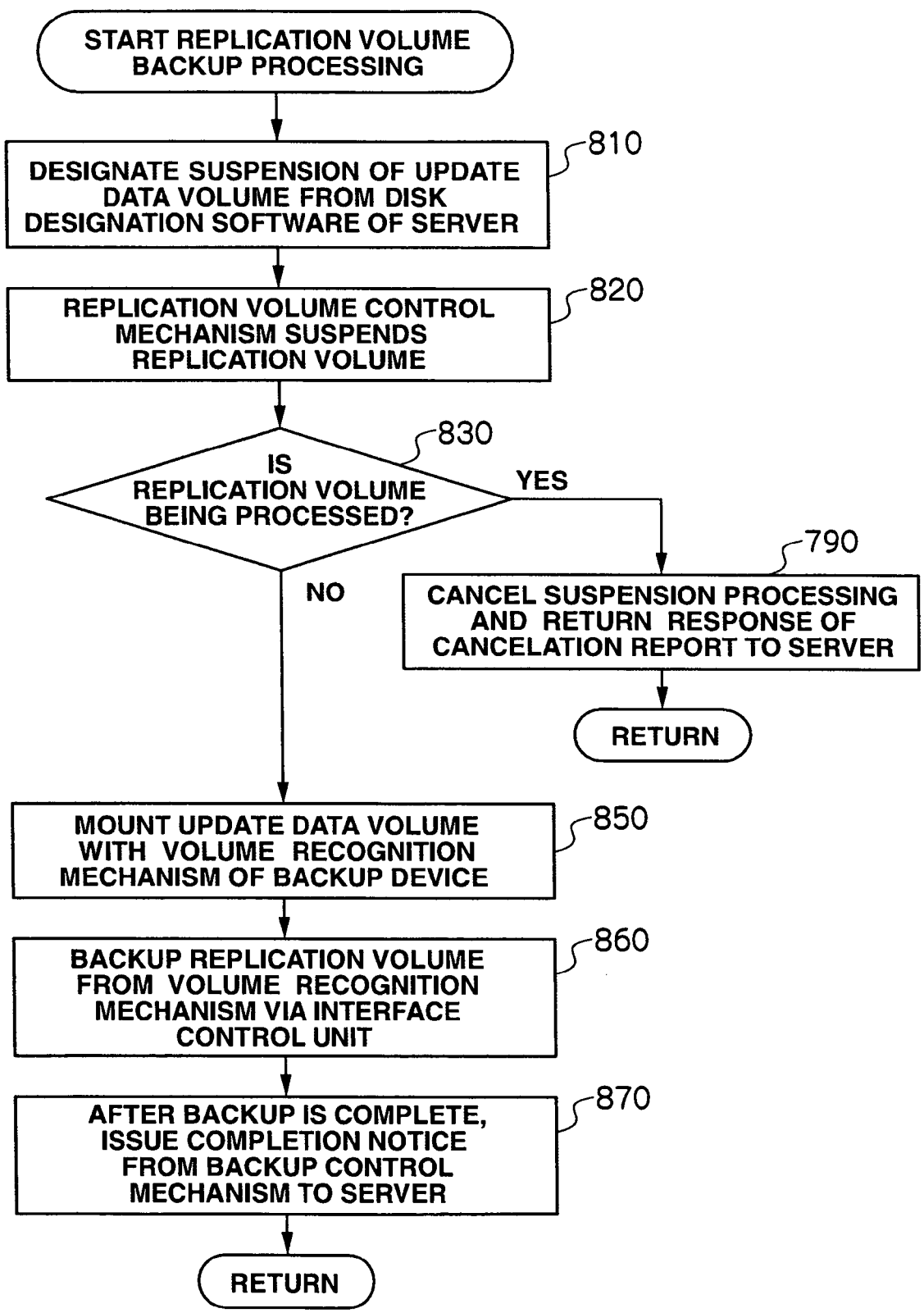
FIG. 11 is a flowchart showing the replication volume backup processing.

FIG. 11 is a flowchart showing the replication volume backup processing. The backup program 2 of the server 27 designates the replication volume control mechanism to suspend the replication volume (810). This designation, for example, is issued in each predetermined interval (unit of days, weeks, months). The replication volume control mechanism suspends the replication volume (820). At step 830, the replication volume control mechanism 13 judges whether the replication volume is being processed, and, when this is negated, the volume recognition mechanism 24 of the backup device mounts the replication volume 20 on the backup volume 300 of the backup device (850). The volume recognition mechanism backs up the data of the replication volume via the interface control units 6, 25 (860).

Next, the backup control mechanism 230 of the backup device issues a backup completion notice to the backup program 2 of the server (870). At step 830, when the replication volume 19 is being processed, the replication volume control mechanism 13 cancels the suspension of the replication volume, and issues a cancellation report as the response to the server 27.

Relation of the backup of the replication volume 19 and the backup of the update data volume 20 is as follows. When the backup (initial copy) of the replication volume is complete, during the subsequent backup, the difference data of the update data volume 20 is backed up in the backup device 35 at an appropriate timing and frequency. Therefore, the backup device 35 is able to retain the data of the data volume 18 based on the backup data of the replication volume 19 and the backup data of the update data volume 20. Incidentally, the replication volume 19 and data volume 18 may be of a synchronous copy relationship instead of the asynchronous copy relationship described above.

Figure 12:
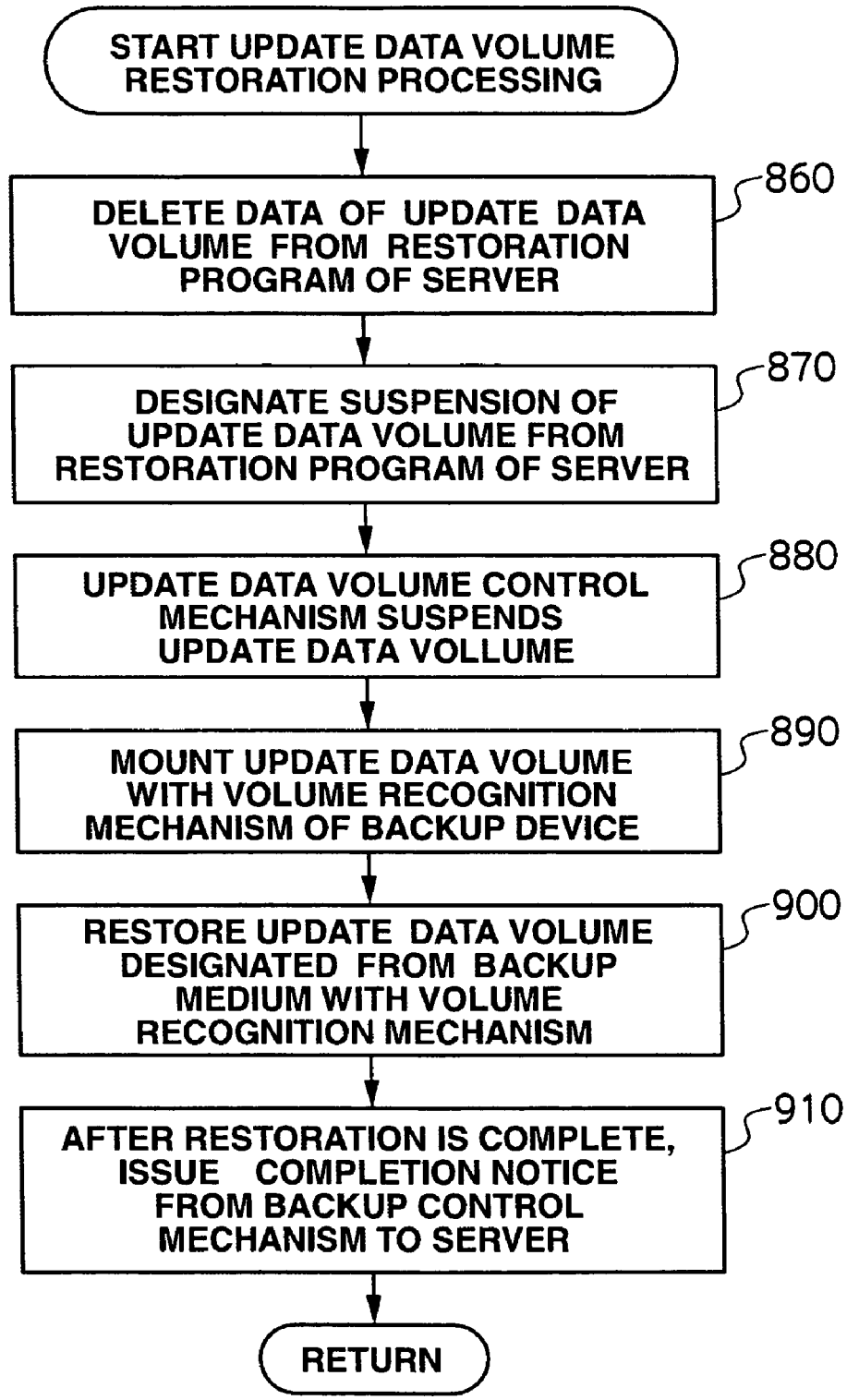
FIG. 12 is a flowchart showing the update data volume restoration processing.

FIG. 12 is a flowchart showing the restoration processing of the update data volume 20. a control command for deleting the update data volume 19 is issued from the restoration management program 2 of the server to the command device 17 of the primary storage 10 (860). Next, the restoration management program of the server issues a designation for suspending the update data volume to the update data control mechanism 16 (870). The update data control mechanism suspends the update data volume (880).

Next, the volume recognition mechanism 24 of the backup device 35 mounts the update data volume 20 on the update data backup volume 302 (890). The volume recognition mechanism restores the backup data from the backup volume to the mounted update data volume (900). After this restoration is complete, the update data volume restoration mechanism issues a restoration completion notice to the server (910).

Figure 13:
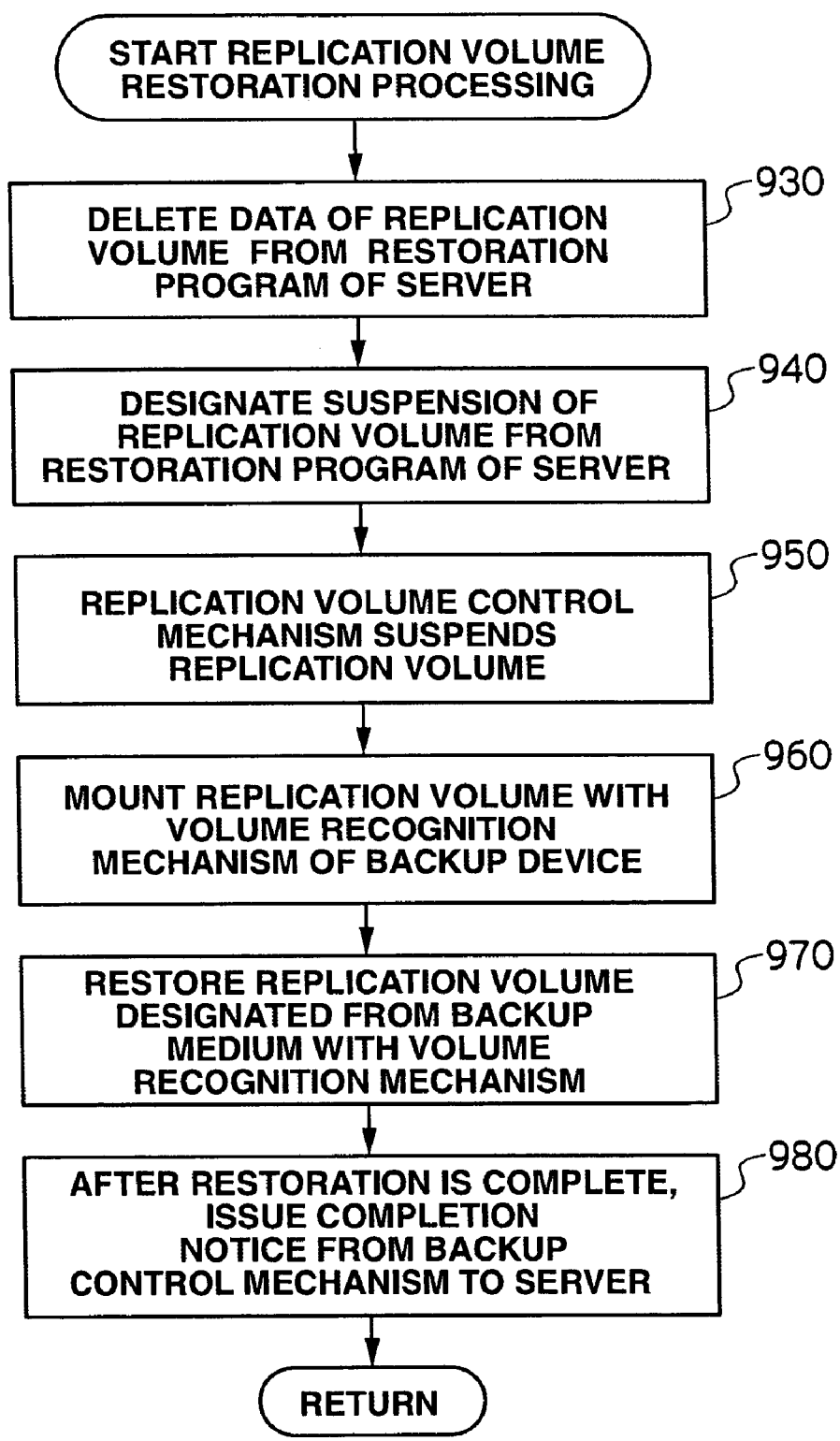
FIG. 13 is a flowchart showing the replication data volume restoration processing.

FIG. 13 is a flowchart for explaining the replication volume restoration processing. The restoration management program 2 of the server 27 notifies the deletion of replication volume data to the replication volume restoration mechanism (920). The restoration management program of the server designates the suspension of the replication volume (930). The replication volume restoration mechanism 12 suspends the replication volume (940). The volume recognition mechanism 24 of the backup device mounts the replication volume 19 on the backup volume 300 for the replication volume (950). The volume recognition mechanism 240 of the backup device copies the data of the backup volume 300 to the mounted replication volume 19 (970). The backup control mechanism of backup device notifies the server to the effect that the restoration is complete (980).

Figure 14:
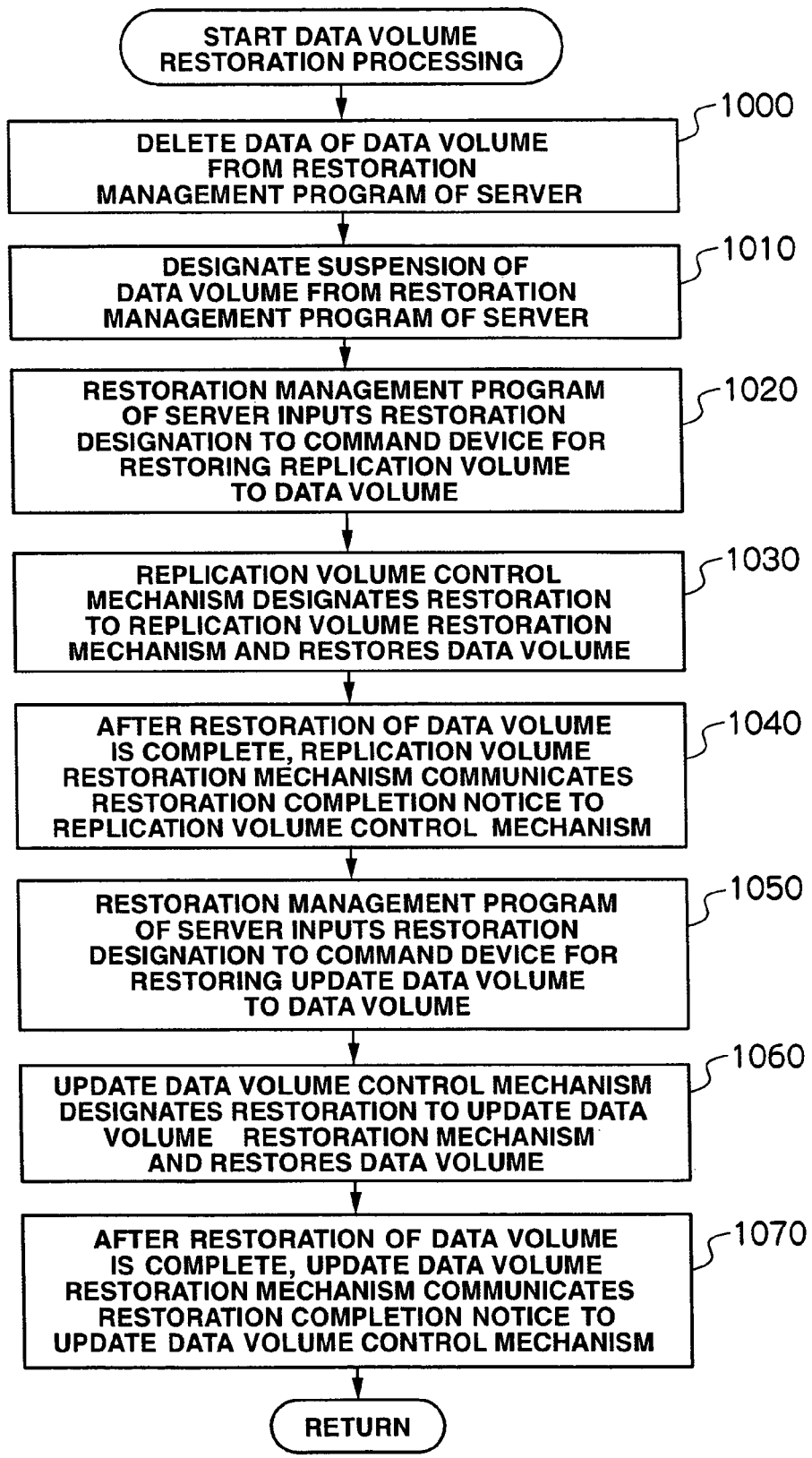
FIG. 14 is a flowchart showing the data volume restoration processing.

FIG. 14 is a flowchart showing the processing for restoring the data of the replication volume 19 and update data volume 20, to which restoration processing was applied, to the data volume 18. The restoration management program of the server registers a control command for deleting all data of the data volume in the command device 17 of the primary storage. The control unit 7 receives the control order and deletes the data before the restoration of the data volume 18 (1000).

The restoration management program of the server designates the control unit 7 to suspend the data volume (1010). The restoration management program of the server registers in the command device a control order for restoring the replication volume data in the data volume (1020).

The replication volume restoration mechanism 11 accesses the command device, processes the control order of the command device, and restores the replication volume data to the data volume (1030). After this restoration is complete, the replication volume restoration mechanism notifies this to the replication volume control mechanism 130 (1040). The restoration management program of the server that received this notice registers in the command device a control command for restoring the update data volume data to the data volume (1050).

The update data volume restoration mechanism analyzes the control order of the command device and restores the data of the update data volume to the data volume (1060). After the update data volume restoration mechanism 12 completes the restoration of the data volume, it notifies such completion to the update data volume control mechanism 16(1070). When the restoration of the entire backup data of the replication volume 19 and update data volume in the data volume is complete, the control unit 7 notifies the restoration management program of the server 27 to such effect. Thereby, the server will know that the restoration has been completed.

What is claimed is:

1. A storage control system, comprising:
a host system;
a storage device having a data volume storing data to be exchanged with said host system, a replication volume of said data volume, and a difference data volume configured independently from said data volume and which stores difference data in relation to said data volume; and
a backup device having a backup volume storing backup data of said replication volume and said difference data volume,
wherein said host system has a backup control module for recognizing said difference data volume of said storage device apart from said data volume, and backing up said difference data volume in said backup volume, and
wherein said host system starts backing up said difference data volume in said backup volume when the storage capacity of said difference data volume falls below a prescribed capacity.

2. The storage control system according to claim 1, wherein said backup device is a second storage connected to said storage device via a storage area network.

3. The storage control system according to claim 1, wherein said backup device mounts said difference data volume on said backup volume.

4. The storage control system according to claim 1, wherein said storage device has a control table describing the contents of said difference data volume, and said host system differentiates and recognizes said difference data volume from said data volume by recognizing said control table.

5. The storage control system according to claim 4, wherein said host system has a program for recognizing said difference data volume, and causing said storage device to back up said difference data volume in said backup device.

6. The storage control system according to claim 1, wherein said host system has a restoration control module for restoring said backup volume to said difference data volume and said data volume.

7. The storage control system according to claim 1, wherein said storage device sets an identifier for recognizing said difference data volume from said host system upon updating said difference data volume, and said host system differentiates and recognizes said difference data volume from said data volume based on said identifier.

8. The storage control system according to claim 1, wherein the backup of said difference data volume to the backup storage resource of said backup device is conducted based on the judgment of whether the unused storage capacity of said difference data volume no longer exists.

9. The storage control system according to claim 8, wherein said backup is conducted when said judgment is affirmed.

10. The storage control system according to claim 8, wherein when the storage capacity of said difference data volume is unused, said information is written in said difference data volume, and a name is thereupon set to said difference data volume.

11. The storage control system according to claim 1, wherein the backup storage resource of said backup device is a tape device.

12. The storage control system according to claim 1, wherein the backup of said replication volume in said backup device is conducted in predetermined intervals, and said difference data volume is backed up in said backup device during such period.

13. A storage control system, comprising:
a host system;
a storage device having a data volume storing data to be exchanged with said host system, a replication volume of said data volume, and a difference data volume configured independently from said data volume and which stores difference data in relation to said data volume; and
a backup device having a backup volume storing backup data of said replication volume and said difference data volume,
wherein said host system has a backup control module for recognizing said difference data volume of said storage device apart from said data volume, and backing up said difference data volume in said backup volume,
wherein said storage device sets an identifier for recognizing said difference data volume from said host system upon updating said difference data volume, and said host system differentiates and recognizes said difference data volume from said data volume based on said identifier, and
wherein said identifier is the update date and time of said difference data volume.

14. The storage control system according to claim 13, wherein said backup device is a second storage connected to said storage device via a storage area network.

15. The storage control system according to claim 13, wherein said backup device mounts said difference data volume on said backup volume.

16. The storage control system according to claim 13, wherein said storage device has a control table describing the contents of said difference data volume, and said host system differentiates and recognizes said difference data volume from said data volume by recognizing said control table.

17. The storage control system according to claim 16, wherein said host system has a program for recognizing said difference data volume, and causing said storage device to back up said difference data volume in said backup device.

18. The storage control system according to claim 13, wherein said host system has a restoration control module for restoring said backup volume to said difference data volume and said data volume.

19. The storage control system according to claim 13, wherein the backup storage resource of said backup device is a tape device.

20. A storage control system, comprising:
a host system;
a storage device having a data volume storing data to be exchanged with said host system, a replication volume of said data volume, and a difference data volume configured independently from said data volume and which stores difference data in relation to said data volume; and
a backup device having a backup volume storing backup data of said replication volume and said difference data volume,
wherein said host system has a backup control module for recognizing said difference data volume of said storage device apart from said data volume, and backing up said difference data volume in said backup volume, and wherein said difference data volume includes information concerning an attribute showing that it is difference data, an address of said data volume storing said difference data, content of said difference data, and update data and time of said difference data volume.

* * * * *